(12) United States Patent
Vest (10) Patent No.: US 11,844,661 B2
(45) Date of Patent: Dec. 19, 2023

(54) FLOSSER

(71) Applicant: Kurt G. Vest, North Logan, UT (US)

(72) Inventor: Kurt G. Vest, North Logan, UT (US)

( * ) Notice: Subject to any disclaimer, the term of this patent is extended or adjusted under 35 U.S.C. 154(b) by 219 days.

(21) Appl. No.: 17/200,549

(22) Filed: Mar. 12, 2021

(65) Prior Publication Data

US 2022/0287809 A1 Sep. 15, 2022

(51) Int. Cl.
*A61C 15/04* (2006.01)

(52) U.S. Cl.
CPC ................... *A61C 15/046* (2013.01)

(58) Field of Classification Search
CPC ....... A61C 15/04; A61C 15/046; A61C 15/00; A61C 15/02; A46B 15/0071
See application file for complete search history.

(56) References Cited

U.S. PATENT DOCUMENTS

| | | | | |
|---|---|---|---|---|
| 1,268,944 | A * | 6/1918 | Ecaubert | A61C 15/046 132/325 |
| 3,559,226 | A * | 2/1971 | Burns | A46B 7/04 15/167.1 |
| 4,965,416 | A * | 10/1990 | Bachmann | G01P 15/135 200/61.45 M |
| 5,101,843 | A * | 4/1992 | Peng | A61C 15/046 132/323 |
| 5,860,434 | A * | 1/1999 | Sines | A61C 15/046 132/325 |
| 2008/0223398 | A1 * | 9/2008 | Morgan | A61C 15/046 132/324 |
| 2011/0073133 | A1 * | 3/2011 | Crossman | A61C 15/046 132/323 |
| 2012/0111358 | A1 * | 5/2012 | Prokopchuk | A61C 15/046 132/323 |
| 2015/0335408 | A1 * | 11/2015 | Lee | A61C 15/046 132/200 |
| 2016/0067021 | A1 * | 3/2016 | Zwimpfer | A61C 15/02 425/542 |
| 2019/0099249 | A1 * | 4/2019 | Lai | A46B 9/045 |

(Continued)

FOREIGN PATENT DOCUMENTS

| | | | |
|---|---|---|---|
| EP | 3117797 A1 | * | 1/2017 |
| KR | 20170066972 A | * | 6/2017 |

(Continued)

OTHER PUBLICATIONS

English Translation of Korean Patent Application Publication No. KR20170066972 (2017) (Year: 2017).*

(Continued)

*Primary Examiner* — Cris L. Rodriguez
*Assistant Examiner* — Karim Asqiriba
(74) *Attorney, Agent, or Firm* — Kirton McConkie; Brian Tucker (57) ABSTRACT

Flossers are designed to simplify flossing with braces including facilitating the insertion of floss into and the maneuvering of the floss within the embrasure spaces. The flossers can include an inner prong and an outer prong between which a length of floss extends. The outer prong can be configured to insert between the teeth and the wire of the braces while the inner prong is positioned inside the teeth. While positioned between the wire and the teeth, the outer prong can be maneuvered to thereby floss the embrasure spaces.

13 Claims, 7 Drawing Sheets

(56) References Cited

U.S. PATENT DOCUMENTS

2019/0358005 A1\* 11/2019 Filsouf ................. A61C 15/046
2020/0178681 A1\* 6/2020 Chen ................... A46B 15/0073
2020/0345126 A1\* 11/2020 Huang ................. A46B 5/0037

FOREIGN PATENT DOCUMENTS

| WO | WO-0249528 A2 \* | 6/2002 | ............. A61C 13/12 |
| WO | WO-2012090007 A1 \* | 7/2012 | ........... A61C 15/042 |

OTHER PUBLICATIONS

English Translation of European Patent Application Publication No. EP3117797 (2017) (Year: 2017).\*

\* cited by examiner

FLOSSER

CROSS-REFERENCE TO RELATED APPLICATIONS

N/A

BACKGROUND

A flosser is an oral hygiene device that holds a small length of dental floss. The flosser typically includes two spaced-apart prongs between which the floss extends. These prongs are therefore a substitute for wrapping the floss around the fingers or otherwise holding the floss while maneuvering it between the teeth.

When an individual has braces, the wire that extends between brackets on adjacent teeth make it difficult to floss. In particular, when either floss or a flosser is used, the wire blocks the floss from being inserted directly up or down between the teeth and into the embrasure spaces. As a result, many individuals with braces will thread floss into the embrasure spaces between the wire and the gum line. Flossing in this manner is tedious and therefore many individuals with braces will forego flossing the embrasure spaces.

BRIEF SUMMARY

Embodiments of the present invention are directed to flossers. The flossers are designed to simplify flossing with braces including facilitating the insertion of floss into and the maneuvering of the floss within the embrasure spaces. Flossers configured in accordance with embodiments of the present invention can include an inner prong and an outer prong between which a length of floss extends. The outer prong can be configured to insert between the teeth and the wire of the braces while the inner prong is positioned inside the teeth. While positioned between the wire and the teeth, the outer prong can be maneuvered to thereby floss the embrasure spaces.

In some embodiments, a flosser can include a main body having a distal end and a proximal end, an inner prong that extends distally from the distal end of the main body, an outer prong that extends distally from the distal end of the main body, the outer prong being spaced from the inner prong and floss that extends between a distal end of the inner prong and a distal end of the outer prong. A thickness of the distal end of the outer prong may be less than a thickness of the distal end of the inner prong.

In some embodiments, a flosser may include a main body having a distal end and a proximal end, an inner prong that extends distally from the distal end of the main body, an outer prong that extends distally from the distal end of the main body and floss that extends between a distal end of the inner prong and a distal end of the outer prong. A thickness of the distal end of the outer prong may be less than a thickness of the distal end of the inner prong. The outer prong may include a recess in an outer surface and an outer end of the floss may be fully contained within the recess.

In some embodiments, a flosser may include a main body having a distal end and a proximal end, an inner prong that extends distally from the distal end of the main body, an outer prong that extends distally from the distal end of the main body, the outer prong being angled away from the inner prong, the outer prong including a recess in an outer surface and floss having an inner end that is secured to the inner prong and an outer end that is secured to the outer prong, the outer end being contained within the recess. A thickness of the distal end of the outer prong may be less than a thickness of the distal end of the inner prong.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

Understanding that these drawings depict only typical embodiments of the invention and are not therefore to be considered limiting of its scope, the invention will be described and explained with additional specificity and detail through the use of the accompanying drawings in which.

DETAILED DESCRIPTION

Figure 1A:
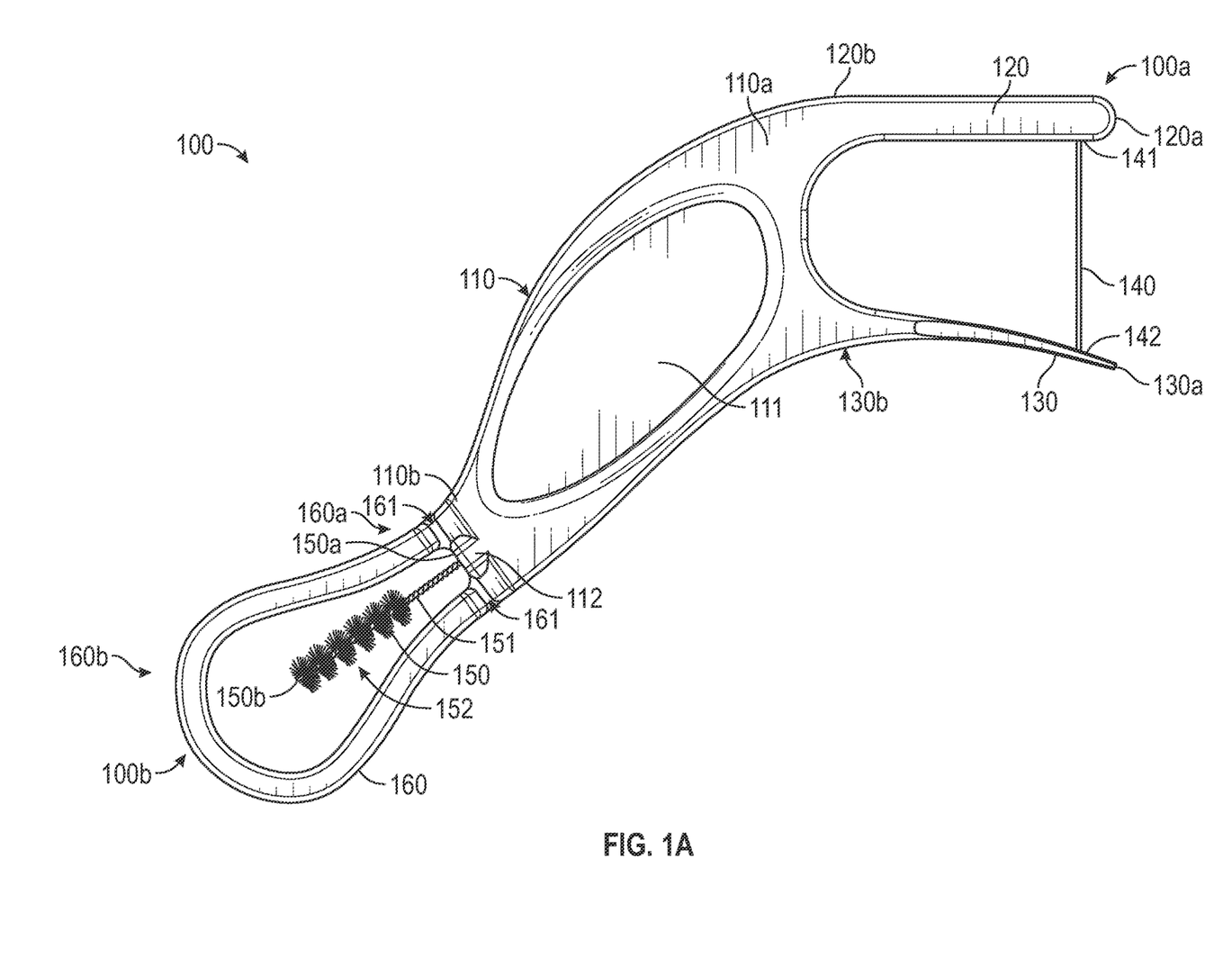
FIGS. 1A-1C each provide a view of a flosser that is configured in accordance with one or more embodiments of the present invention.
Figure 1B:
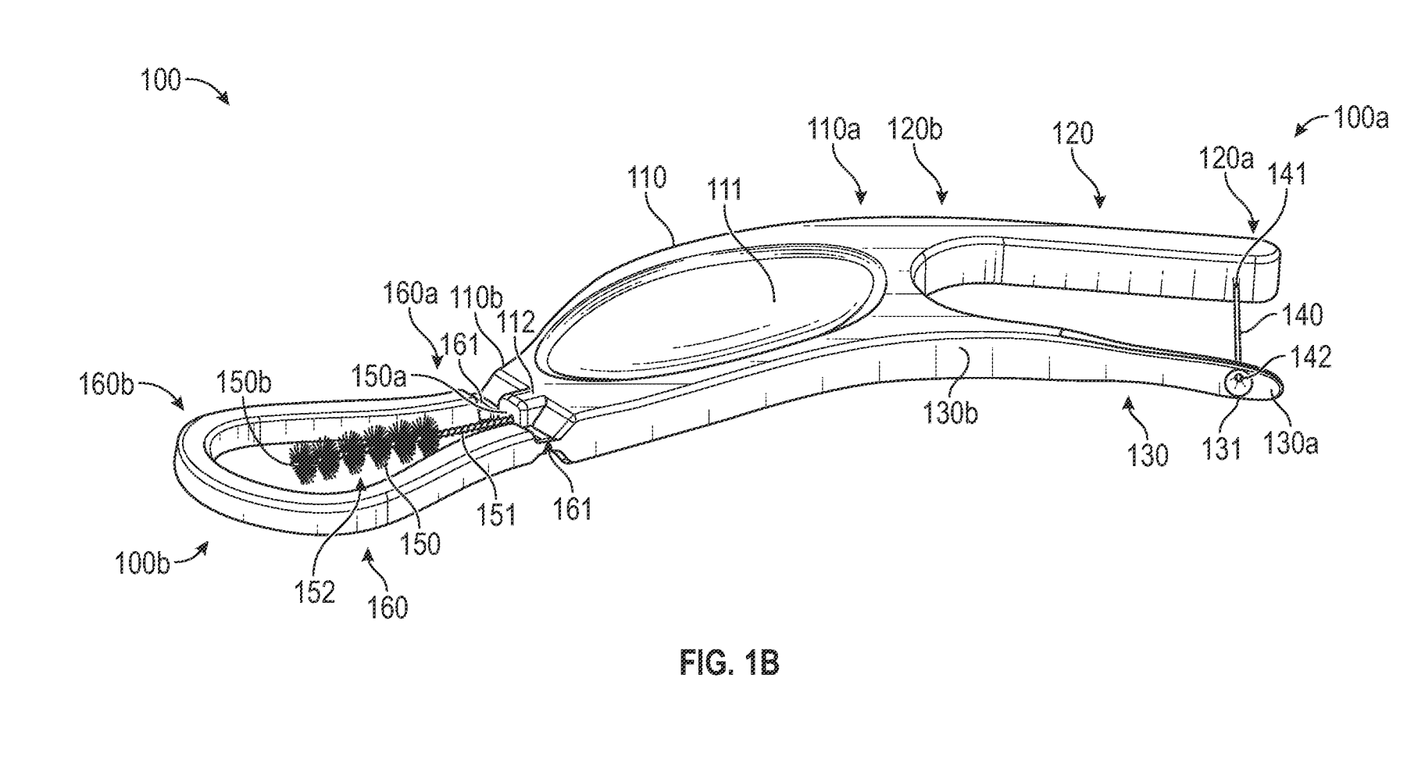
Figure 1C:
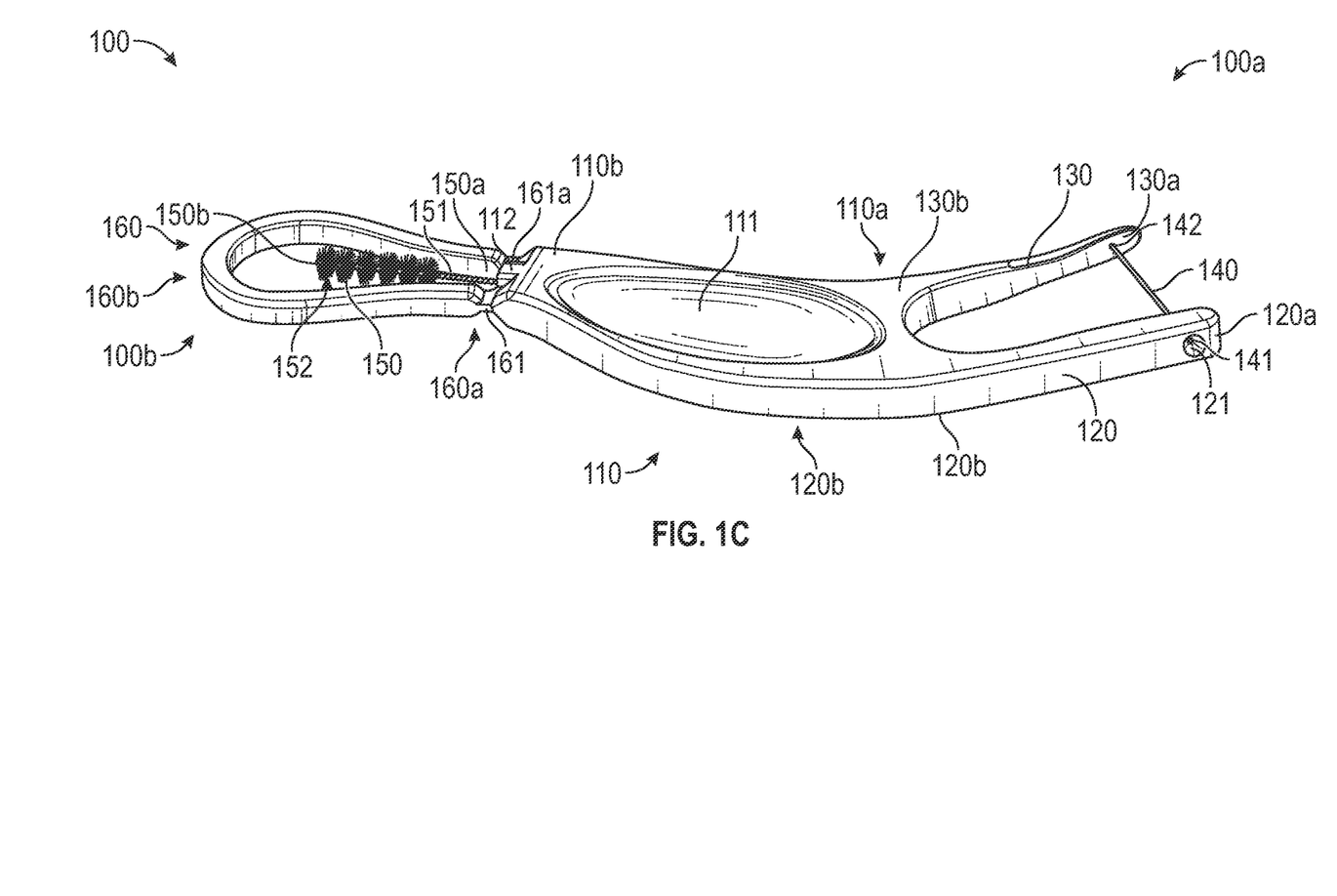

In this specification and the claims, the distal end of a flosser will refer to the end that includes the floss and the proximal end of the flosser will refer to the end opposite the distal end. Accordingly, while flossing, an individual will hold the flosser with the distal end extending distally from the individual's hand. FIGS. 1A-1C each provide a different view of a flosser 100 that is configured in accordance with one or more embodiments of the present invention. The upward-facing side in FIGS. 1A and 1B can be considered a first side while the upward-facing side in FIG. 1C can be considered a second side. In some embodiments, these first and second sides may be symmetrical.

Flosser 100 has a generally flat shape that extends from a distal end 110a to a proximal end 100b. Flosser 100 includes a main body 110 having a distal end 110a and a proximal end 110b, an inner prong 120 and an outer prong 130 that extend distally from opposing sides of distal end 110a of main body 110, floss 140 that extends between inner prong 120 and outer prong 130, an interdental brush 150 that extends proximally from proximal end 110b of main body 110 and a loop 160 that extends proximally from proximal end 110b of main body 110 and surrounds interdental brush 150.

In some embodiments, main body 110 can include a gripping region 111 formed in/on either or both the first side and the second side. For example, in the depicted embodiments, gripping region 111 is a recessed region having an elongated shape that accommodates a finger or thumb.

At one edge of main body 110, distal end 110a transitions into proximal end 120b of inner prong 120 which then extends to distal end 120a. At an opposite edge of main body 110, distal end 110a transitions into proximal end 130b of outer prong 130 which then extends to distal end 130a. Accordingly, distal end 120a of inner prong 120 is spaced apart from distal end 130a of outer prong 130 to thereby form an opening across which floss 140 spans. In the context of inner prong 120 and outer prong 130, the terms "inner" and "outer" represent that inner prong 120 and outer prong 130 will be positioned on the inner side of the teeth and the outer side of the teeth respectively when floss 140 is positioned between adjacent teeth.

An inner end 141 of floss 140 is secured to inner prong 120 towards distal end 120*a* and an outer end 142 of floss 140 is secured to outer prong 130 towards distal end 130*a*. In some embodiments, a recess 131 may be formed in the outer surface of outer prong 130 (i.e., the surface of outer prong 130 that faces away from inner prong 120) to thereby cause outer end 142 of floss 140 to be embedded within outer prong 130. For example, outer end 142 may include a knot which prevents outer end 142 from being pulled through a hole in outer prong 130. Notably, this hole is separate from recess 131. More particularly, the diameter or width of recess 131 is greater than the diameter or width of the hole through which floss 140 passes. In such cases, the knot can be housed within recess 131 so that the knot does not extend outwardly beyond the outer surface of outer prong 130. As described in greater detail below, recess 131 can facilitate inserting outer prong 130 between the teeth and the wire of braces. In some embodiments, a recess 121 may also be formed in the outer surface of inner prong 120 (i.e., the surface of inner prong 120 that faces away from outer prong 130) to thereby cause inner end 141 of floss 140 to be embedded within inner prong 120.

In some embodiments, a supporting region 112 may be formed at proximal end 110*b* of main body 110. A distal end 150*a* of interdental brush 150 can be secured within or to supporting region 112. In some embodiments, interdental brush 150 can include a base 151 that extends from distal end 150*a* to proximal end 150*b* and bristles 152 that extend outwardly from base 151 at proximal end 150*b*. In some embodiments, base 151 may be formed of twisted wire and bristles 152 may be formed of nylon. However, base 151 and bristles 152 can be formed of any suitable material.

In some embodiments, loop 160 may include a distal end 160*a* that is coupled to proximal end 110*b* of main body 110 via living hinges 161 that are positioned on opposite sides of supporting region 112. In such cases, loop 160 can be pivoted at living hinges 161 to expose brush 150.

Figure 2:
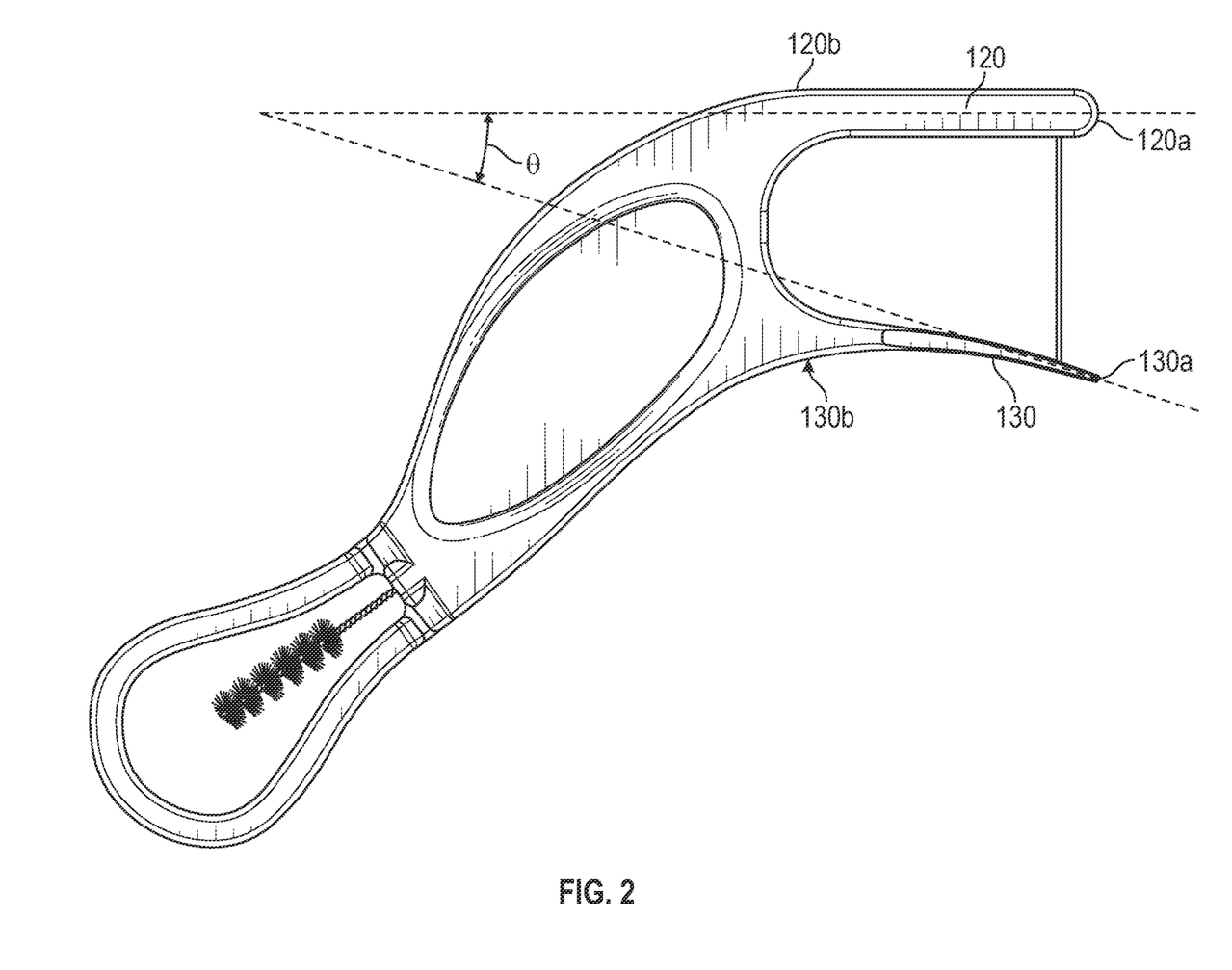
FIG. 2 illustrates how the outer prong of the flosser of FIGS. 1A-1C can extend away from the inner prong.

FIG. 2 represents how outer prong 130 can be configured to extend away from inner prong 120 in some embodiments. In particular, distal end 130*a* of outer prong 130 can be oriented at an angle θ relative to the orientation of inner prong 120. Stated another way, the distance between inner prong 120 and outer prong 130 can increase towards distal end 100*a*. For example, in some embodiments, the angle θ can be approximately 17.5 degrees, between 17 and 18 degrees, between 16 and 19 degrees, between 15 and 20 degrees, or between another suitable range. In some embodiments, the length of floss 140 between the inside edges of inner prong and outer prong 130 may be approximately 13.7 mm, between 13.5 and 13.9 mm, between 13.3 and 14.1 mm, between 13.1 and 14.3 mm or between another suitable range.

In some embodiments, such as the embodiment shown in FIG. 2, outer prong 130 can be curved away from inner prong 120. In other embodiments, outer prong 130 can extend linearly away from inner prong 120. This angling of outer prong 130 away from inner prong 120 can facilitate inserting outer prong 130 between the teeth and the wire of braces and can facilitate the maneuvering of floss 140 within the embrasure spaces.

Figure 3:
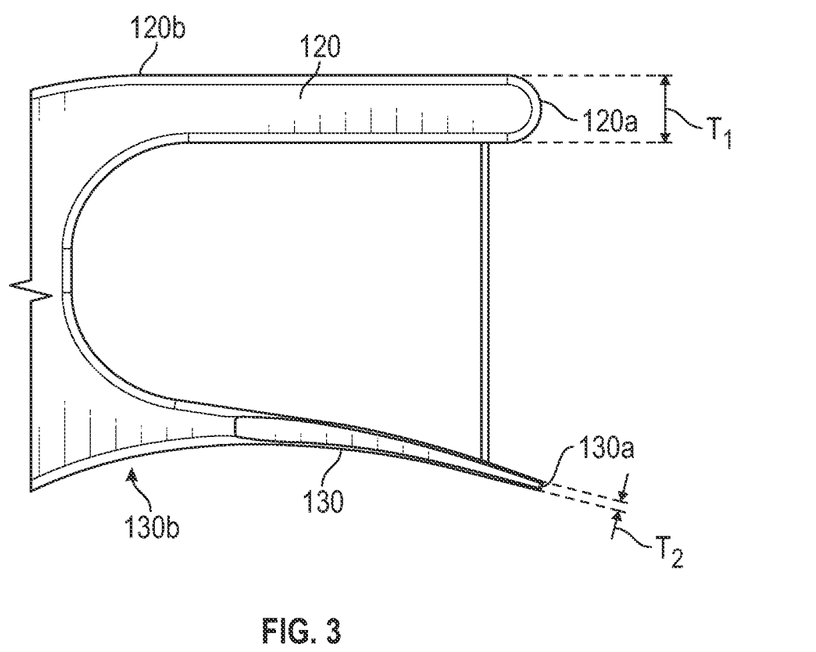
FIG. 3 illustrates the thicknesses of the inner and outer prongs of the flosser of FIGS. 1A-1C.

FIG. 3 represents how the thickness ($T_1$) of inner prong 120 can be greater than the thickness ($T_2$) of outer prong 130. For example, in some embodiments, $T_1$ may be approximately 3 mm, between 2 and 4 mm, between 1 and 5 mm, or between another suitable range, while $T_2$ may be approximately 0.5 mm, between 0.4 and 0.6 mm, between 0.3 and 0.7 mm, between 0.2 and 0.8 mm, between 0.1 and 0.9 mm or between another suitable range. In some embodiments, $T_2$ may decrease towards distal end 130*a* such that distal end 130*a* is relatively thin to thereby allow it to be easily inserted between the teeth and the wire of braces.

Figure 4:
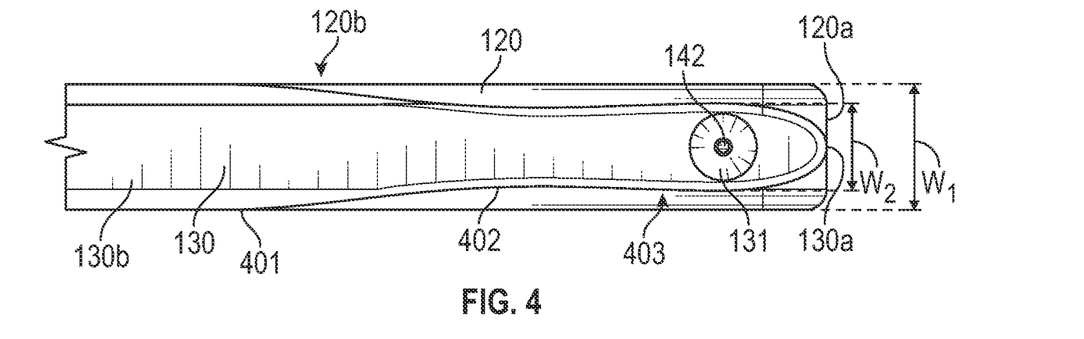
FIG. 4 illustrates the widths of the inner and outer prongs of the flosser of FIGS. 1A-1C.

FIG. 4 represents how the width ($W_1$) of inner prong 120 can be greater than the width ($W_2$) of at least the distal portion of outer prong 130. As shown, $W_2$ may be equal to $W_1$ at proximal end 130*b* and up to a first point 401 of outer prong 130. At first point 401, $W_2$ may gradually decrease until a second point 402, and may then slightly increase or remain the same until a third point 403 after which rounded distal end 130*a* is formed. In some embodiments, third point 403 may be proximate to recess 131 such that second point 402 represents a narrowed region of outer prong 130 that is proximal to recess 131/floss 140. Accordingly, the width ($W_2$) of outer prong 130 can be reduced relative to the width ($W_1$) of inner prong 120 at points proximal to floss 140. For example, in some embodiments, $W_1$ may be approximately 3 mm, between 2.8 mm and 3.2 mm, between 2.6 mm and 3.4 mm or between another suitable range, while $W_2$ at second point 402 may be approximately 2.1 mm, between 2.0 and 2.2 mm, between 1.9 and 2.3 mm, between 1.8 and 2.4 mm, between 1.7 and 2.5 mm or between another suitable range.

Figure 5A:
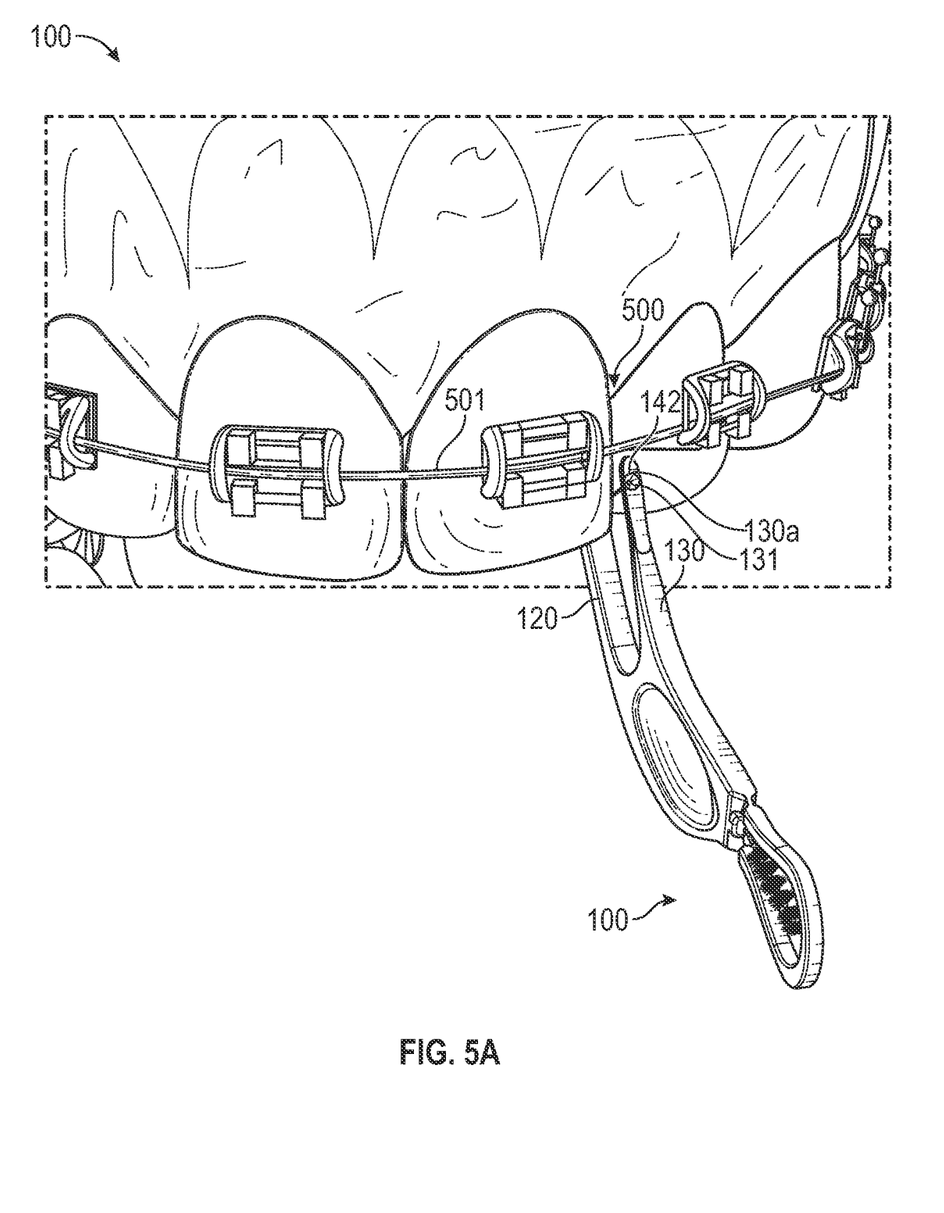
FIGS. 5A and 5B provide an example of how an individual with braces can use the flosser of FIGS. 1A-1C to floss the embrasure spaces.
Figure 5B:
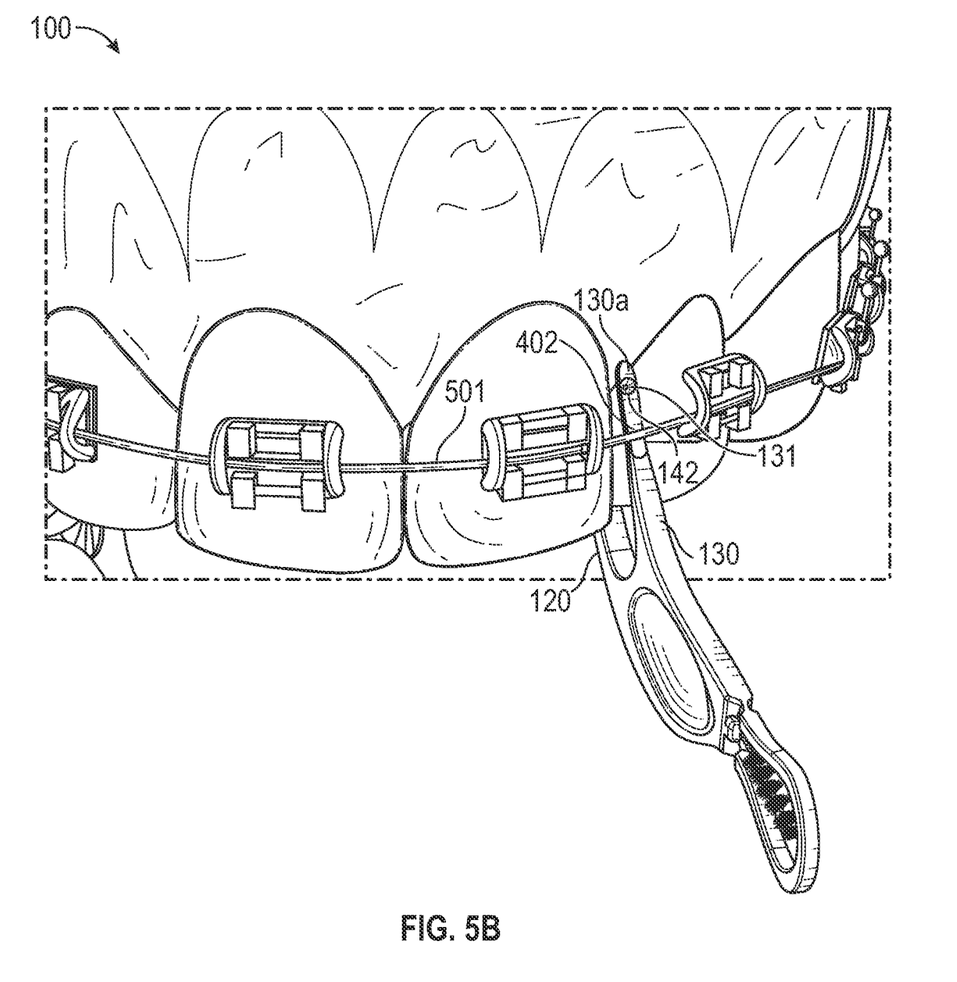

FIGS. 5A and 5B illustrate how the configuration of flosser 100 facilitates flossing with braces. In FIG. 5A, it is assumed that an individual with braces has inserted flosser 100 into his or her mouth and positioned inner prong 120 inside the teeth and outer prong 130 outside the teeth. With inner prong 120 and outer prong 130 straddling the teeth in this manner, the individual may advance floss 140 between the teeth.

Due to the configuration of outer prong 130, the individual may insert distal end 130*a* between the teeth and wire 501 to thereby allow floss 140 to enter embrasure space 500 as represented in FIG. 5B. More specifically, the thin and narrow configuration of distal end 130*a* of outer prong 130 allows it to pass through the small gaps that oftentimes exist between the teeth and wire 501. Notably, because outer end 142 of floss 140 may be contained within recess 131, outer end 142 may not catch on wire 501 to impede insertion of floss 140.

With floss 140 inserted into embrasure space 500, the narrowed region of outer prong 130 formed at second point 402 may be positioned behind wire 501. This narrowed region can enable greater movement of outer prong 130, and therefore greater movement of floss 140, while floss 140 is in embrasure space 500. Also, due to outer prong 130 being thin and oriented away from inner prong 120, floss 140 can reach farther towards the front of the gums (e.g., to fully floss the buccal embrasure spaces). Stated another way, the thin and outwardly curved/oriented outer prong 130 can facilitate pivoting outer prong 130 around wire 501 to reach all areas of the embrasure spaces and fully along the gum line.

In short, the configuration of outer prong 130 relative to inner prong 120 enables an individual with braces to floss with a flosser as if he or she did not have braces. The configuration of outer prong 130 allows outer end 142 of floss 140 to be moved into the embrasure spaces while also retaining the ability to move floss 140 within the embrasure spaces. With this ability to use flossers, individuals with braces are more likely to floss.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed:

1. A flosser comprising:
   a main body having a distal end and a proximal end;
   an inner prong that extends distally from the distal end of the main body;
   an outer prong that extends distally from the distal end of the main body, the outer prong being spaced from the inner prong;
   floss that extends between a distal end of the inner prong and a distal end of the outer prong; and
   an interdental brush that extends from the proximal end of the main body and is positioned within a loop that is coupled to a supporting region formed at the proximal end of the main body via two living hinges, the two living hinges being positioned on opposite sides of the supporting region, the loop surrounding the interdental brush between the two opposite living hinges, wherein the interdental brush comprises a base and bristles that extend outwardly from the base, the base being formed of twisted wire and the bristles being formed of nylon;
   wherein a thickness of the distal end of the outer prong is less than a thickness of the distal end of the inner prong, and wherein the thickness of the distal end of the outer prong is less than 0.6 mm;
   wherein the outer prong includes a recess in an outer surface, the recess extending into the outer surface less than 0.6 mm but not extending to an inner surface of the outer prong, the outer prong also including a hole that extends from the inner surface of the outer prong and into the recess, the hole being centered within the recess, and wherein an outer end of the floss is tied in a knot that is fully contained within the recess when the knot is positioned against the hole and centered within the recess.

2. The flosser of claim 1, wherein the thickness of the outer prong tapers towards the distal end of the outer prong.

3. The flosser of claim 1, wherein a width of the distal end of the outer prong is less than a width of the distal end of the inner prong.

4. The flosser of claim 3, wherein the width of the distal end of the outer prong is less than 3 mm.

5. The flosser of claim 3, wherein the width of the distal end of the outer prong is less than 2.5 mm.

6. The flosser of claim 3, wherein the width of the outer prong forms a narrowed region that is proximal to the floss.

7. The flosser of claim 1, wherein the outer prong is oriented away from the inner prong.

8. The flosser of claim 1, wherein the outer prong curves away from the inner prong.

9. The flosser of claim 1, wherein a distance between the inner prong and the outer prong increases towards the distal ends.

10. A flosser comprising:
    a main body having a distal end and a proximal end;
    an inner prong that extends distally from the distal end of the main body;
    an outer prong that extends distally from the distal end of the main body;
    floss that extends between a distal end of the inner prong and a distal end of the outer prong; and
    an interdental brush that extends from the proximal end of the main body and is positioned within a loop that is coupled to a supporting region formed at the proximal end of the main body via two living hinges, the two living hinges being positioned on opposite sides of the supporting region, the loop surrounding the interdental brush between the two opposite living hinges, wherein the interdental brush comprises a base and bristles that extend outwardly from the base, the base being formed of twisted wire and the bristles being formed of nylon;
    wherein a thickness of the distal end of the outer prong is less than a thickness of the distal end of the inner prong, and wherein the thickness of the distal end of the outer prong is less than 0.6 mm;
    wherein the outer prong includes a recess in an outer surface, the recess extending into the outer surface less than 0.6 mm but not extending to an inner surface of the outer prong, the outer prong also including a hole that extends from an inner surface of the outer prong and into the recess, the hole being centered within the recess, and wherein an outer end of the floss is tied in a knot that is fully contained within the recess when the knot is positioned against the hole and centered within the recess.

11. The flosser of claim 10, wherein a width of the distal end of the outer prong is less than a width of the distal end of the inner prong.

12. The flosser of claim 11, wherein the outer prong is oriented away from the inner prong.

13. A flosser comprising:
    a main body having a distal end and a proximal end;
    an inner prong that extends distally from the distal end of the main body;
    an outer prong that extends distally from the distal end of the main body, the outer prong being spaced from the inner prong;
    floss that extends between a distal end of the inner prong and a distal end of the outer prong;
    an interdental brush that extends from the proximal end of the main body and is positioned within a loop that is coupled to a supporting region formed at the proximal end of the main body via two living hinges, the two living hinges being positioned on opposite sides of the supporting region, the loop surrounding the interdental brush between the two opposite living hinges;
    wherein a thickness of the distal end of the outer prong is less than 0.6 mm and a thickness of the distal end of the inner prong is between 2 and 4 mm;
    wherein the outer prong includes a recess in an outer surface, the recess extending into the outer surface less than 0.6 mm but not extending to an inner surface of the outer prong, the outer prong also including a hole that extends from the inner surface of the outer prong and into the recess, the hole being centered within the recess, and wherein an outer end of the floss is tied in a knot that is fully contained within the recess when the knot is positioned against the hole and centered within the recess;
    wherein a width of the distal end of the outer prong is equal to a width of the distal end of the inner prong from the proximal end of the main body to a first point of the outer prong, the width of the distal end of the outer prong decreases from the first point to a second point of the outer prong such that between the first and second points, the width of the distal end of the outer prong is less than the width of the distal end of the inner prong, the width of the distal end of the outer prong increases from the second point to a third point of the outer prong, and the outer prong forms a rounded distal end after the third point;

wherein the width of the distal end of the inner prong is between 2.8 mm and 3.2 mm, and the width of the distal end of the outer prong is between 2.0 mm and 2.2 mm at the second point;

wherein the interdental brush comprises a base and bristles that extend outwardly from the base, the base being formed of twisted wire and the bristles being formed of nylon.

\* \* \* \* \*